United States Patent [19]

Azeez et al.

[11] 4,435,243

[45] Mar. 6, 1984

[54] DEPOSIT INFORMATION LABELING MECHANISM FOR ATM ENVELOPE DEPOSITING EQUIPMENT

[75] Inventors: Syed A. Azeez, North Canton; Paul A. Leipelt; Herbert Morello, both of Canton, all of Ohio

[73] Assignee: Diebold, Incorporated, Canton, Ohio

[21] Appl. No.: 422,835

[22] Filed: Sep. 24, 1982

[51] Int. Cl.³ .................................. B32B 3/00

[52] U.S. Cl. .................................. 156/361; 156/363; 156/384; 109/24.1; 346/22

[58] Field of Search .................. 156/384, 540-542, 156/361-364; 109/24.1; 346/22

[56] References Cited

U.S. PATENT DOCUMENTS

| | | | |
|---|---|---|---|
| 3,836,980 | 9/1974 | Grosswiller | 346/22 |
| 4,035,808 | 7/1977 | Karp | 156/384 |
| 4,085,687 | 4/1978 | Beck | 109/24.1 |
| 4,101,366 | 7/1978 | Teraoka et al. | 156/378 |
| 4,321,103 | 3/1982 | Lindstrom | 156/351 |

*Primary Examiner*—David A. Simmons
*Attorney, Agent, or Firm*—Frease & Bishop

[57] ABSTRACT

The depositor device is an attachment for and is combined with known ATM-type depositories for banking deposits energized by customer identification bank credit cards which are used for verifying the customer's identity. The depositor prints on an adhesive label stuck after printing onto the deposit-containing envelope entered into the depository, information entered into the ATM control system by the customer concerning the amount of the deposit, the customer's checking and/or savings account numbers, the customer's personal identification number, the time and date of the deposit, etc. Such information is necessary or desirable for the rapid processing by the bank of the deposit transaction. The label is on a label supply carrying strip when printed, and is peeled from the carrying strip and stuck onto the deposit-containing envelope, which may contain coin, as the envelope moves through the depositor.

26 Claims, 16 Drawing Figures

DEPOSIT INFORMATION LABELING MECHANISM FOR ATM ENVELOPE DEPOSITING EQUIPMENT

CROSS-REFERENCE TO RELATED PATENTS

The depositor mechanism of the invention for automatically providing information on a deposit envelope of details of a deposit being made in an envelope depository constitutes improvements upon the envelope depository of U.S. Pat. No. 4,085,687.

BACKGROUND OF THE INVENTION

1. Field of the Invention

The invention relates to an improved depositor device combined with banking depository equipment for supplying to a deposit envelope information concerning the contents of said envelope being entered into a typical automatic banking depository located in a safelike enclosure, either by itself or along with a separate cash dispensing mechanism. Such depository equipment is frequently called an ATM and normally is energized using a customer identification card containing customer information read by a card reader initially for verifying the customer's identity.

Information on the card in addition to that involved in verifying identity may include the customer's account number, etc.

In addition, the usual ATM has a keyboard in which secret data may be keyed into the controller for the system or to a computer with which the controller may be connected. This keyboard in accordance with the invention also may be used by a customer to enter into the ATM information, such as the amount of the deposit, that it is desired to have printed on a deposit-containing envelope which is being deposited.

Further, the depositor mechanism of the invention relates to providing printed information concerning the deposit on a deposit envelope containing deposited material based on data supplied by the customer at the time when the envelope is entered into the depositor by the customer.

Also, the invention relates to transmitting data and other information concerning the contents of the deposit envelope to a printer which prints such information on an adhesive backed or pressure-sensitive label on a label carrying supply strip from which the label is peeled and stuck on the deposit envelope, which envelope may be bulky or have uneven surfaces resulting from coin contained in the deposit envelope.

2. Description of the Prior Art

Prior envelope depository devices such as shown in U.S. Pat. Nos. 3,836,980 and 4,085,687 have involved a printer within or following a protective deposit entry chamber of the depository which prints consecutive identifying numbers and perhaps date and time on the deposit-containing envelope. These prior depositories have separate but coordinated receipt printers which may print the same information on a receipt issued to the customer at the completion of a depositing operation. The printed information including the consecutive four-digit number also is printed on the tape recording all operations of the equipment. However, the four-digit number and other printed information do not provide any direct means of verifying the contents of the deposit envelope being deposited.

It is very convenient for banks to verify the contents of a deposit envelope if information regarding its contents is printed directly on the envelope itself. At the present time, this is not possible as there is no known printing device which can print such deposit information on uneven surfaces such as are present on an envelope containing coins. The printing capabilities of the devices shown in said U.S. Pat. Nos. 3,836,980 and 4,085,687 are not adapted to supply information concerning the deposit envelope contents.

Heretofore, ATM's which have coordinated mechanisms for dispensing cash and for accepting the deposit of envelopes, have only been equipped with printing mechanism of usual construction and operation such as described and illustrated in said U.S. Pat. Nos. 3,836,980 and 4,085,687. These usual printers have been mounted within the depository portion of the ATM below a platen portion of endless belt conveyor means which transports the deposit envelopes from entry to deposit receptacle means or bins in the ATM.

Accordingly, there has been an existing need in the art to provide depositor mechanism which enables information to be supplied in printed form, to a deposit envelope concerning the contents of a deposit envelope, even though coin is contained therein.

SUMMARY OF THE INVENTION

Objectives of the invention include providing a depositor mechanism for use in a remote unattended banking system ATM having deposit-receiving facilities in which information concerning the contents of a deposit envelope, which may be bulky or have uneven surfaces due to the presence of coin therein, may be applied in printed form to such envelope to facilitate banks in verifying the contents of the envelope being deposited; providing such depositor mechanism in which data, supplied by a customer to the deposit-receiving facilities in actuating the equipment for enabling entry therein of a deposit envelope, which relates to the contents of such envelope, is transmitted to a printer which prints such data on a label which is applied to the envelope; providing such depositor mechanism in which such printer prints the envelope contents data or information on a label of a pressure-sensitive or adhesive type carried by a movable supply strip at a printing station whose location is coordinated with the location of an envelope to which said label being printed is to be applied which is stopped at a labeling station in a protected chamber in the deposit facility, such that the label may be peeled from its carrying strip and stuck onto its related envelope upon movement of the envelope to discharge the envelope to a collecting bin accompanied by coordinated movement of the label carrying strip; providing such depositor mechanism with gate means for the protective chamber in which movement of the deposit envelope is stopped while the label related thereto is printed, the operation of which gate means is coordinated with sensor means which control synchronized movement of the label-bearing supply strip and of the deposit envelope to enable actuation of the printer and transfer of a printed label to its related envelope; providing such depositor mechanism with indicator means which actuates the sensor means to stop movement of the supply strip at a location for receiving printed information from the printer related to a deposit envelope to which such label is to be applied; providing such depositor mechanism in which drive means is provided for coordinated actuation of the depositor gate, the printer, the movement of the label supply strip, and movement of the deposit envelope to and from the labeling station; and providing such depositor mechanism which achieves the stated objectives in a reliable, efficient and highly secure manner and which satisfies needs existing in the field of automatic remote depository banking services of readily verifying the contents of a deposit envelope from information regarding its contents located on the envelope in printed form.

Such objectives are obtained by the depositor mechanism generally stated as mechanism for labeling on a deposit-containing envelope deposit information about a deposit in said envelope, in which said deposit information is derived in part from a customer credit card entered by said customer into and read by a card reader in a credit card activated ATM-type envelope depository which verifies said customer's identity, in which said deposit information also is derived in part from indicia including said customer's personal identification number and the amount of the deposit entered by said customer into the depository keyboard, in which the depository has a control system that translates said entered information and indicia into signals transmitted to and from system computer-based control circuitry, in which said depository has conveyor means having conveyor drive means within a safelike compartment having an exit gate movable between closed and open positions at the discharge end of said conveyor means, and in which first sensor means is located adjacent the conveyor discharge end which senses arrival of the leading end of a deposit envelope being deposited and enables opening of said exit gate and continued conveyor means movement; wherein the improvement comprises depositor mechanism mounted at the discharge end of said conveyor means adjacent said exit gate, including, conveyor roll means having upper and lower pinch rolls driven by said conveyor drive means and located in said depositor mechanism at a labeling station communicating with said depository conveyor means when said exit gate is opened by said first sensor means upon sensing the arrival at said first sensor means of the leading end of a deposit containing envelope to be labeled; delivering said deposit-containing envelope by said continued conveyor means movement when said exit gate is open to said driven conveyor roll means at said labeling station to engage the leading end of said deposit-containing envelope with said conveyor roll means to continue envelope movement through said conveyor roll means to adjacent second sensor means; dot matrix impact printer mechanism mounted at a printing station location adjacent said labeling station; pressure-sensitive-label carrying strip means movable in a path of travel from a pay-out spool through said printing and labeling stations to a take-up spool; peeler means engaging said carrying strip at said labeling station; said carrying strip normally being at rest with a label thereon in printing receiving position at said printing station; and means enabled when said second sensor means senses the arrival of the leading end of said deposit-containing envelope at said second sensor means to energize the printer mechanism to print deposit information entered into the depository and transmitted to the printer mechanism, onto said label located at said printing station, to move said carrying strip in its path of travel, and to peel the printed label from the carrying strip at the labeling station by said peeler means onto its related deposit envelope during continued movement of said carrying strip.

BRIEF DESCRIPTION OF THE DRAWINGS

A preferred embodiment of the invention—illustrative of the best mode in which applicants have contemplated applying the principles—is set forth in the following description and shown in the drawings and is particularly and distinctly pointed out and set forth in the appended claims.

FIG. 3 is a plan view partly in section of the mechanism shown in FIG. 4 taken on line 5—5, FIG. 4;

Similar numerals refer to similar parts throughout the various figures of the drawings.

DESCRIPTION OF THE PREFERRED EMBODIMENT

Figure 1:
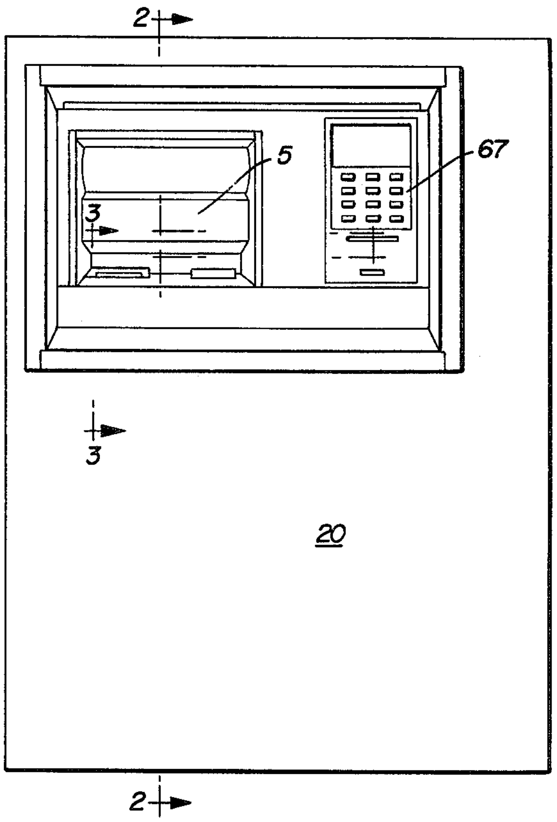
FIG. 1 is a fragmentary somewhat diagrammatic front elevation of an automatic banking equipment envelope depository with the improved depositor device combined therewith.

The new depositor device or mechanism constitutes an accessory coordinated and combined with a known automatic banking system envelope depository of the type of construction shown in U.S. Pat. No. 4,085,687, assigned to the assignee of the present invention and incorporated herein by reference in its entirety. Portions of the depository of said patent to which the new depositor is connected as an accessory are shown in the drawings.

The depository of said patent may be a single depository unit in a safelike enclosure as illustrated, actuated and controlled by a magnetic-stripe card containing information thereon about the card owner, his banking account or accounts and other related data, such card also being one used in an automatic cash dispenser. Sometimes the depository equipment may be included in the same safelike enclosure as a separate unit alongside of a cash dispenser.

In any event, the depository equipment of said patent normally issues to a customer a receipt for the deposited envelope on which is printed a four-digit number also printed on the envelope being deposited.

This four-digit number is then used by the bank in connection with identifying the customer and the contents of the deposit envelope so that proper accounting records can be entered about the deposit in the customer's account.

In accordance with the invention, the four-digit number printer associated with the depository equipment of the patent is removed and the new depositor device of the invention is combined and coordinated with the remaining portion of the depository equipment.

Portions of the depository equipment of said U.S. Pat. No. 4,085,687 are diagrammatically generally indicated at 1 in FIGS. 2 and 3 including the discharge end 2 of the belt conveyor having discharge rolls 3 around which belts 4 are trained. The belt conveyor 2 moves an envelope being deposited through the depository equipment 1 from the facia 5 where the envelope is entered into the depository equipment.

A gate 6 operated by a gate actuator 7 is located adjacent the discharge rolls 3 and a sensor generally indicated at 8 is located between the discharge rolls 3 and the gate 6. The sensor may comprise a light source 9 and a receiver 10 with the light beamed through discharge channel 11 extending from the conveyor 2 to the gate 6.

Figure 2:
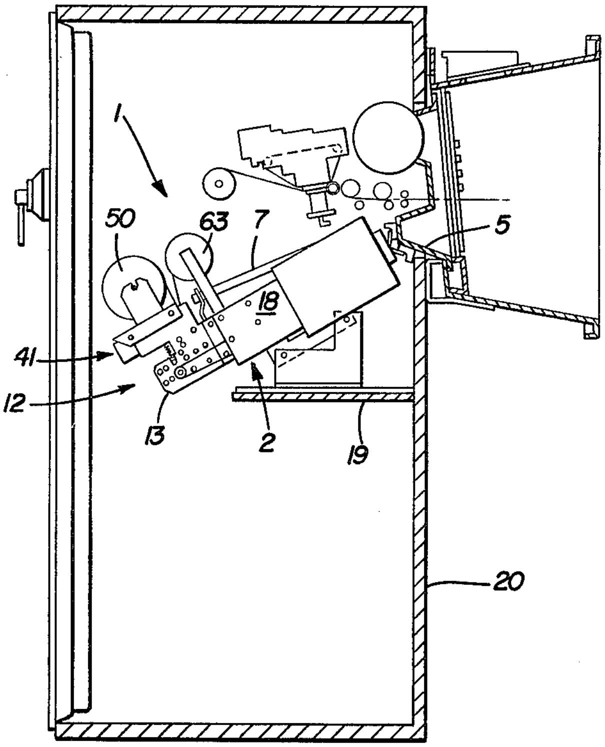
FIG. 2 is a sectional view looking in the direction of the arrows 2—2, in FIG. 1.
Figure 3:
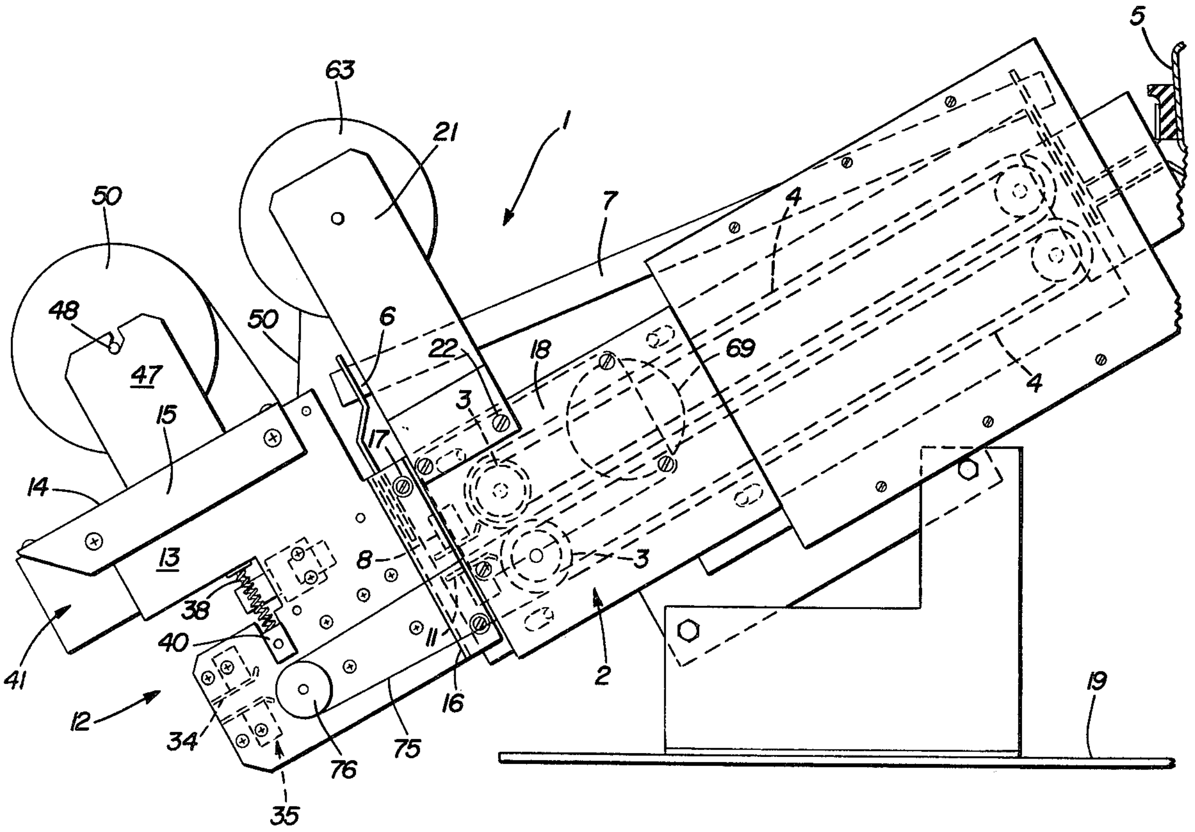
FIG. 3 is an enlarged fragmentary side view partly in elevation and partly in section showing the new depositor device installed as a coordinated component of the envelope depository with parts removed from the safe-like enclosure wherein depository and depositor are located.
Figure 6A:
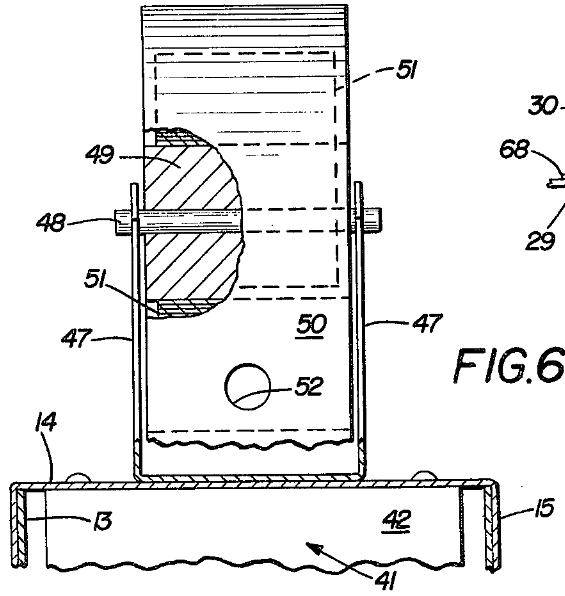
FIG. 6A is a fragmentary end view of portions of the mechanism shown in FIG. 5, looking in the direction of the arrows 6A—6A, FIG. 4.
Figure 6:
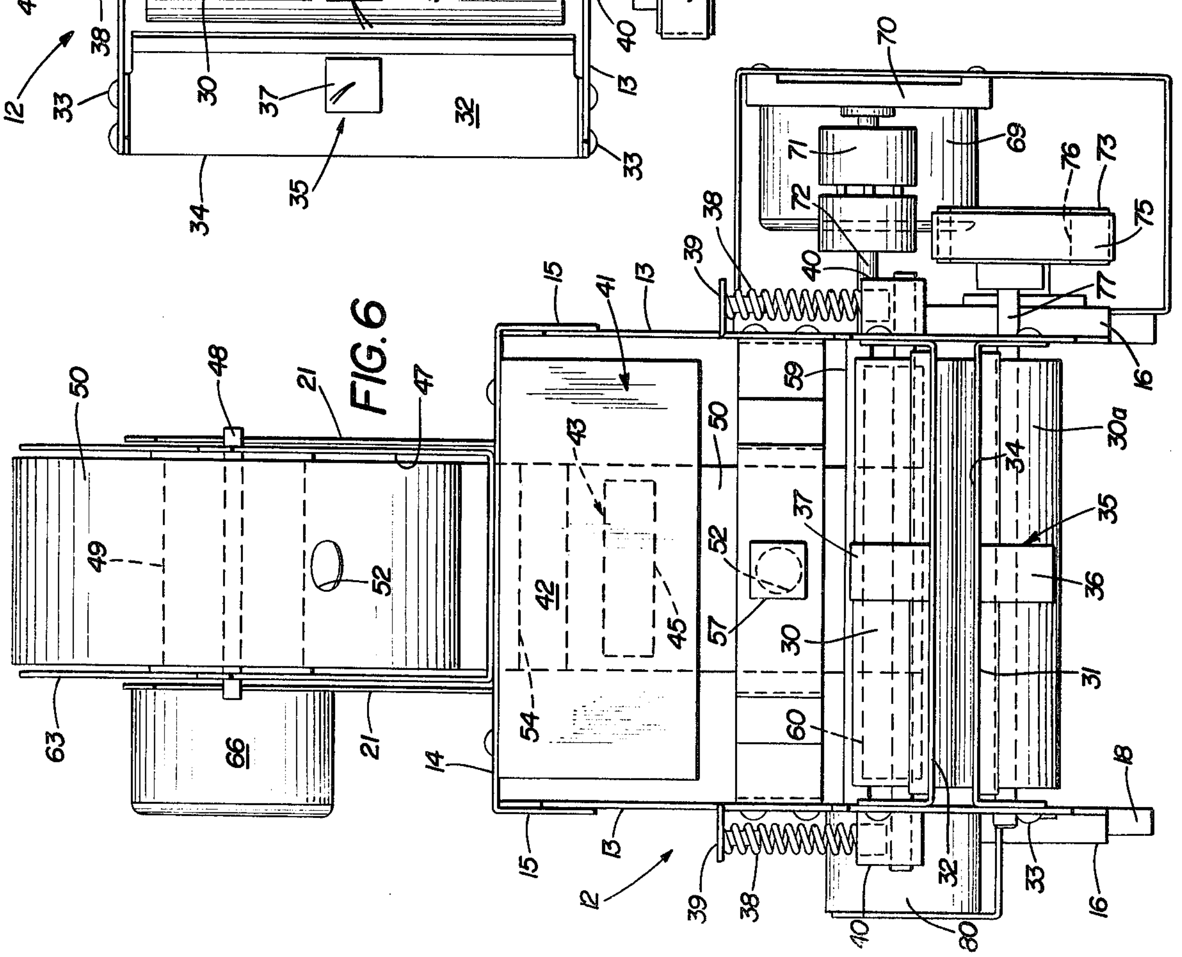
FIG. 6 is an end view of the mechanism shown in FIG. 4 looking in the direction of the arrows 6—6, FIG. 4.

The improved depositor device is generally indicated at 12 and has a frame formed of spaced side plates 13 and a top plate 14 connected in any suitable manner by flanges 15 (FIGS. 6 and 6A). The side plates 13 may be formed with offset edge flanges 16 bolted or otherwise secured at 17 to the ends of the main side frame members 18 of the depository equipment 1. The depository equipment 1 is mounted as shown in FIGS. 2 and 3 on a ledge or shelf member 19 within the safelike cabinet 20 of the depository equipment 1.

Figure 4:
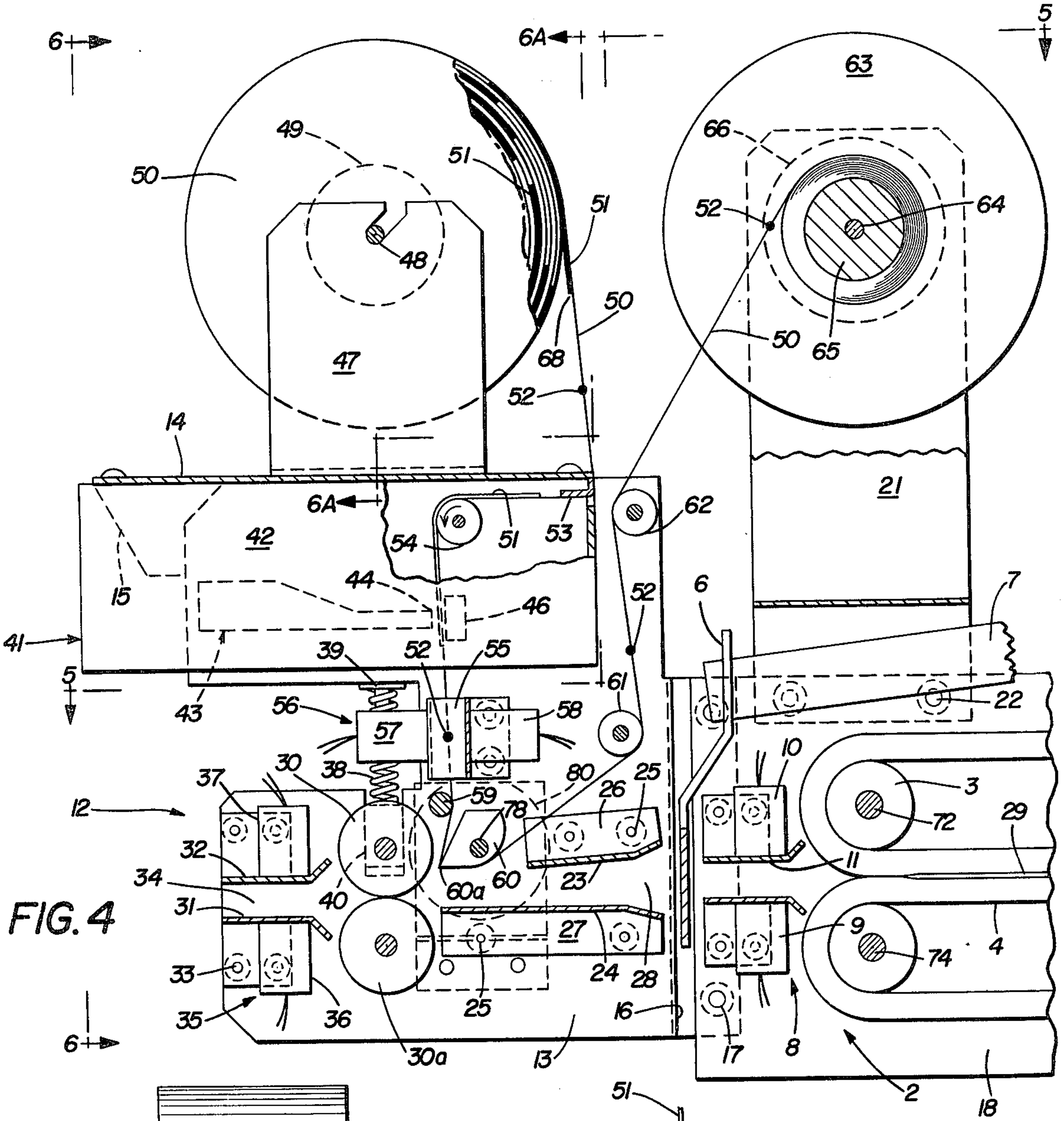
FIG. 4 is a fragmentary somewhat diagrammatic side view with some parts in section of the new depositor component and portions of the envelope depository further enlarged from the illustration thereof in FIG. 3.
Figure 5:
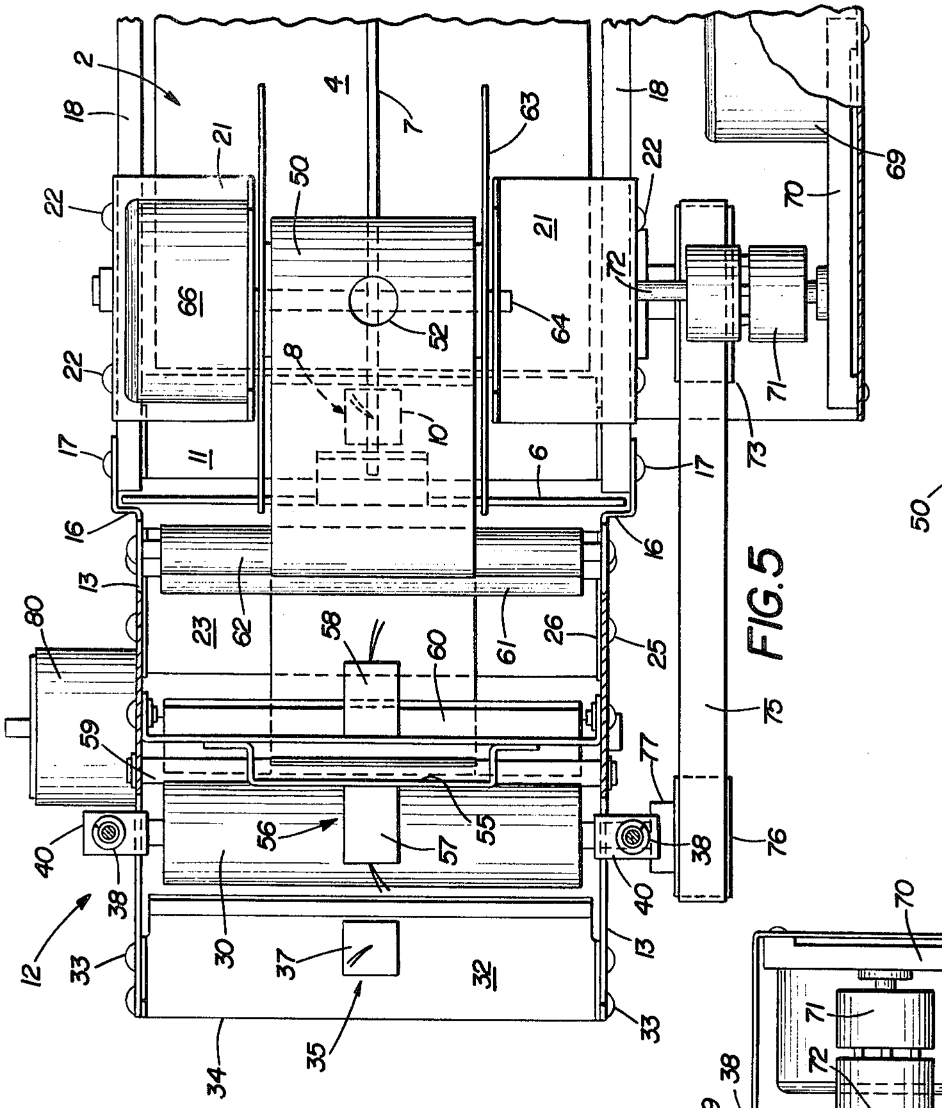

A pair of spaced offset brackets 21 are mounted on and extend upwardly from the main side frame members 18, being connected to members 18 by bolts 22 (FIGS. 4 and 5). Cross-wall members 23 and 24 are bolted at 25 through flanges 26 and 27 to the depositor side plates 13 and extend in spaced relation between the side frames to form a receiving channel 28 for a deposit envelope 29. The envelope 29 passes from the discharge channel 11 of the depository 1 into the channel 28 of the depositor 12 when the gate 6 is in open position.

A pair of pinch rolls 30 and 30a are located between the side plates 13 and are journaled at their ends in the side plates laterally beyond the depositor-receiving channel 28 to receive the forward end of an envelope 29 being delivered to the depositor. Another set of cross-wall members 31 and 32 similarly are mounted by bolts 33 in spaced relation between the side plates 13 beyond the rolls 30 and 30a forming a discharge channel 34 for the depositor 12.

A second sensor generally indicated at 35 having a light source 36 and a light receiver 37 are mounted on the cross members 31 and 32, respectively. Light is beamed from the light source 36 through depositor discharge channel 34 to form the second sensor 35.

Preferably the pinch rolls 30 and 30a have pressure maintained between the rolls by springs 38 reacting between outturned flanges 39 on the side plates 13 and the journals 40 for the ends of the roll shaft of the upper movable roll 30a of the pair of rolls 30–30a.

A printer generally indicated at 41 contained in a housing 42 is mounted on the underside of top plate 14. In accordance with the invention the printer 41 is an impact-type dot-matrix printer. The printer 41 preferably is a 21-column printer supplied by Star Micronics, Inc., a subsidiary of Star Manufacturing Company, Ltd., Suite 2308 Pan American Building, 200 Park Avenue, New York, N.Y. 10160. The printer is identified as Model DP-822 Miniature Dot Matrix Impact Printer.

This type of dot printer has a printer head with miniature solenoid-activated needles or wires. As the head sweeps across the article to be printed, such as a pressure-sensitive-label carried on a supply strip, characters are formed by selectively energizing the solenoids. Characters are formed by dots made by the printer head wires or needles. Each character is seven dots high and can be five, seven or nine dots wide depending upon the software selected for or supplied with the printer. The printer has an inked ribbon located between the paper to be printed and the printer head. The paper being printed is backed up by a platen in the printer.

Such printers, because of their unique mechanism, are capable of printing any type of character such as Japanese, Arabic, Roman scripts, and preferably upper case letters and numbers.

The printer is microprocessor based and is controlled by the host computer for known magnetic stripe credit card controlled banking equipment, such as the depository equipment with which the improved depositor is combined. Depending on the type of software selected, any character can be printed.

In the drawings, particularly FIGS. 4 and 6, the printer 41, in its housing 42, is indicated as having a movable head 43. The tip 44 of the head 43 sweeps laterally, of the rectangle 45 illustrated in dotted lines in FIG. 6, from side to side as each line of printed material is printed. As characters are printed by the printer head tip 44 the paper being printed is backed up by the platen 46.

Figure 14:
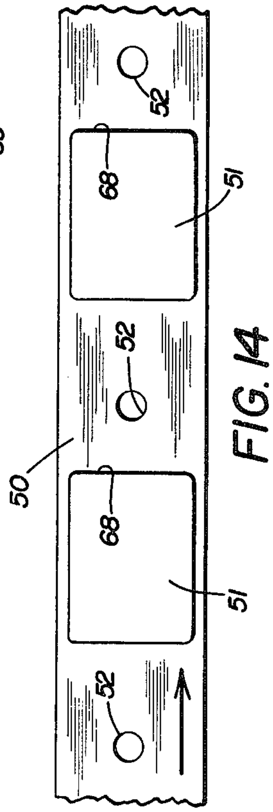
FIG. 14 is a diagrammatic plan view of the label carrying strip illustrating strip position indicators which coordinate movement of the strip and other parts of the mechanism for printing data on a label concerning the contents of a particular deposit envelope to which such label when printed is to be applied.

A U-shaped bracket 47 mounted on the depositor top plate 14 supports a shaft 48 for a spool 49 on which a label-carrying and supply strip 50 is wound. A series of pressure-sensitive or adhesive backed paper labels 51 are carried at spaced intervals a predetermined distance apart on the supply strip 50 as indicated by heavy lines in FIG. 4 along the inner wound surface of successive wraps of strip 50. Two labels 51 are shown in FIG. 14 spaced apart on supply strip 50. The strip 50 is formed with sensor actuating holes or openings 52 intermediate successive labels 51 and the label and opening spacing and relative locations are of importance as described below.

The label supply strip 50 is threaded in the depositor 12 from spool 49, through an opening in the printer housing 42 around angle guide 53, then around a printer roll 54. The printer roll is intermittently driven by a motor in printer 41 as described below. Strip 50 then passes down between the tip 44 of printer head 43 and platen 46. Strip 50 then passes through a channel 55 formed by walls of a third sensor indicated generally at 56 having a source of light 57 and a light receiver 58.

Strip 50 then passes at one side of a rod 59 which is a component of the mechanism for peeling a label from the strip. The label peeler also includes a rotatable peeler member 60 which normally is in the peeling position of FIGS. 4 and 12 but which may be rotated in the direction of the arrow shown in FIG. 12 to the nonpeeling position shown in FIG. 13 for a purpose to be described below.

Strip 50 then passes around peeler member 60 and around guide rollers 61 and 62 journaled on and extending between depositor side plates 13 (FIG. 4).

Strip 50 passes from guide roller 62 to take-up reel 63 which is rotatably journaled on spaced offset brackets 21. Take-up reel 63 preferably includes a shaft 64 journaled at its ends in brackets 21, the shaft 64 being surrounded between the reel flanges by a spool 65 on which the delabeled strip 50 is wound. One end of take-up reel shaft 64 is connected with a take-up motor 66 which is a constant torque motor which maintains tension on the strip 50 only sufficient to maintain the strip 50 taut.

Movement of the strip 50 in its path of travel is intermittent as described below. However, the movement is imparted by the printer roll 54 driven by a printer motor which forms part of the printer mechanism 41. This printer motor when energized inches strip 50 downward past the tip 44 of the printer head 43 after the printer head 43 has printed each line of printing on a label 51 at the printing station. The printer motor through roll 54 continues, after printing has ceased, to move the strip downward through the printer 41 until the sensor control hole 52, upstream of the printed label 51, reaches the third sensor 56. This activates the third sensor through the equipment control circuitry to de-energize printer 41 and stop movement of strip 50 until another deposit envelope 29 is entered into the depository 1.

Figure 15:
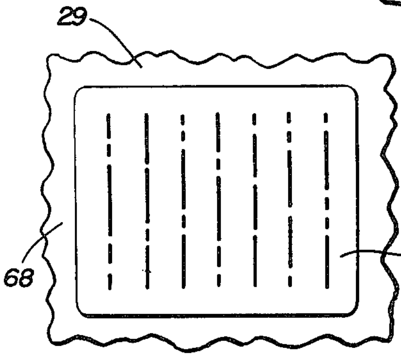
FIG. 15 is a plan view looking in the direction of the arrows 15—15, FIG. 11, of a printed label stuck onto a fragmentary portion of an envelope.
Figure 10:
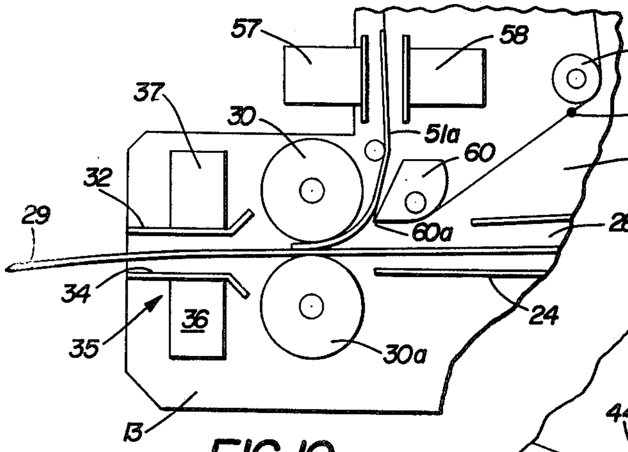
FIG. 10 is a diagrammatic view similar to a portion of FIG. 9 showing the printed label being applied to its related deposit containing envelope as the envelope is moving away from the labeling station.
Figure 11:
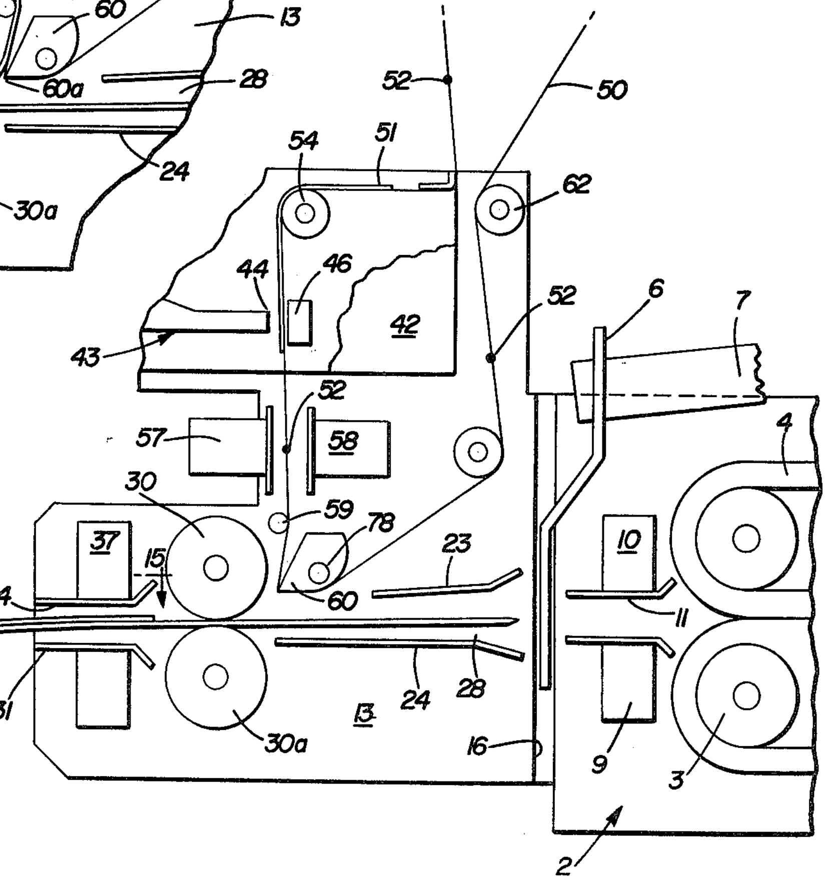
FIG. 11 is a diagrammatic view similar to FIG. 9 showing the deposit-containing envelope completely labeled and being discharged from the mechanism into the safelike enclosure shown in FIG. 2.

A printed label **51*a* is illustrated in FIG. 15 and is the label peeled from the strip 50 during movement of the strip 50 just described. During such movement the printed label 51*a* is peeled, as indicated in FIG. 10, from the strip 50 and is stuck onto the particular or related envelope 29 which has been entered into the depositor 12. The rolls 30 and 30*a* under pressure of springs 38 press the label 51*a* tightly onto the deposit envelope 29 as the label is peeled from strip 50 and as envelope 29 is discharged from the depositor 12 as illustrated in FIGS. 10 and 11**.

Information relating to the deposit material in the deposit envelope 29, which facilitates processing of the deposit envelope 29 by the bank, and which is printed on the label **51*a* that is stuck onto the envelope 29, preferably includes the personal identification number (PIN) of the customer whose bank card is used to activate the depository, and whose identity is being verified in accordance with usual operation of an ATM, which PIN such customer keys into the depository keyboard 67 (FIG. 1**) and is read by the usual card reader and signals thereof are transmitted to the system computer.

Other information to be printed includes the date, time and machine number. Also the customer's account number is read from the bank or credit card and the customer keys in an indication as to whether the deposit is to be made in the customer's checking or savings account, and the amount thereof. Signals concerning all such information through the computer direct the printer 41, when activated, to print the information on a label 51 to provide the printed label **51*a***.

Labels 51 on the supply strip 50 may be 2½" long and 2" wide, for example, and may be spaced 5" apart from leading end 68 from one label to another arranged lengthwise on the strip 50 (FIG. 14). The sensor holes are similarly spaced and each hole 52 preferably is located 1" ahead of the leading end 68 of a label 51. In this manner when the strip 50 is stopped by a sensor hole 52 arriving at the location of the third sensor 56 (FIG. 4) the label 51 upstream of such sensor hole 52 is in position to be printed when the next printed label is called for.

Whenever a printing operation is initiated and the printer motor moves the strip 50 forward in its path of travel the inertia of the label carrying strip and its labels wound in a series of many layers or wraps on spool 49 holds the strip 50 taut between the spool and the printer roll 54 which imparts movement to the strip 50.

The main drive for the bell conveyor of depository 1, as in said U.S. Pat. No. 4,085,687, includes a motor 69 (FIGS. 3, 5 and 6) having driving connection through coupling 71 with the gear box 70 and shaft 72 of upper conveyor discharge roll 3. This drive is extended through a pulley 73 connected to the lower depositor conveyor roll shaft 74 and belt 75 engaging a pully 76 on the shaft 77 of lower depository pinch roll 30. In this manner the movement of the conveyors of the depository 1 and depositor accessory 12 are synchronized.

Figure 12:
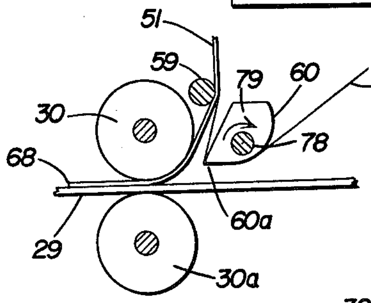
FIG. 12 is a diagrammatic view similar to a portion of FIG. 10 illustrating the step of peeling a label from a portion of a label carrying strip supplying the mechanism with labels.

The label peeler member 60 in normal peeling position as shown in FIGS. 4 and 12 operates typically in a known manner to enable an adhesive member on a carrying strip to be peeled therefrom by sharply distorting the carrying strip during movement around a pointed end or portion such as the pointed end portion **60*a* of peeler member 60**.

However, it is not always desired, in use of the new depositor construction 12 of the invention, to peel labels from the carrying strip 50; for example, when a new roll of label carrying supply strip is installed and threaded through the equipment, or when such carrying strip installation is tested or other components of the depositor 12 are being tested, adjusted or otherwise serviced.

Figure 13:
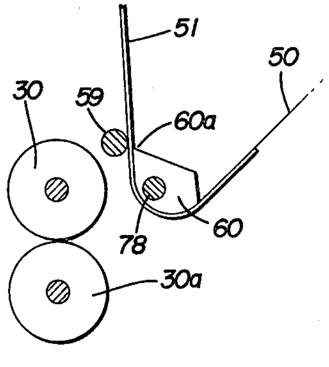
FIG. 13 is a view similar to FIG. 12 illustrating adjustment of the peeling head to prevent label peeling so that the carrying strip may be threaded in the mechanism or tested.

Thus, to change the position of the peeler member 60 to depeeling status, the shaft 78 on which peeler member 60 is mounted, is adapted to be rotated 90° to 95° or so in the direction of the arrow 79 in FIG. 12 to the position shown in FIG. 13 by a rotary solenoid 80 connected with the shaft 78.

The solenoid 80 may be energized when it is desired to deactivate the peeler member 60 by closing a switch (not shown) connected with the solenoid. This may be accomplished when the depositor equipment 12 is being serviced, tested, etc.

The sensors 8, 35 and 56 are well-known optical sensors long used in the construction and operation of ATMs of both the cash dispensing and deposit receiving types.

OPERATION OF THE DEPOSITOR

Figure 7:
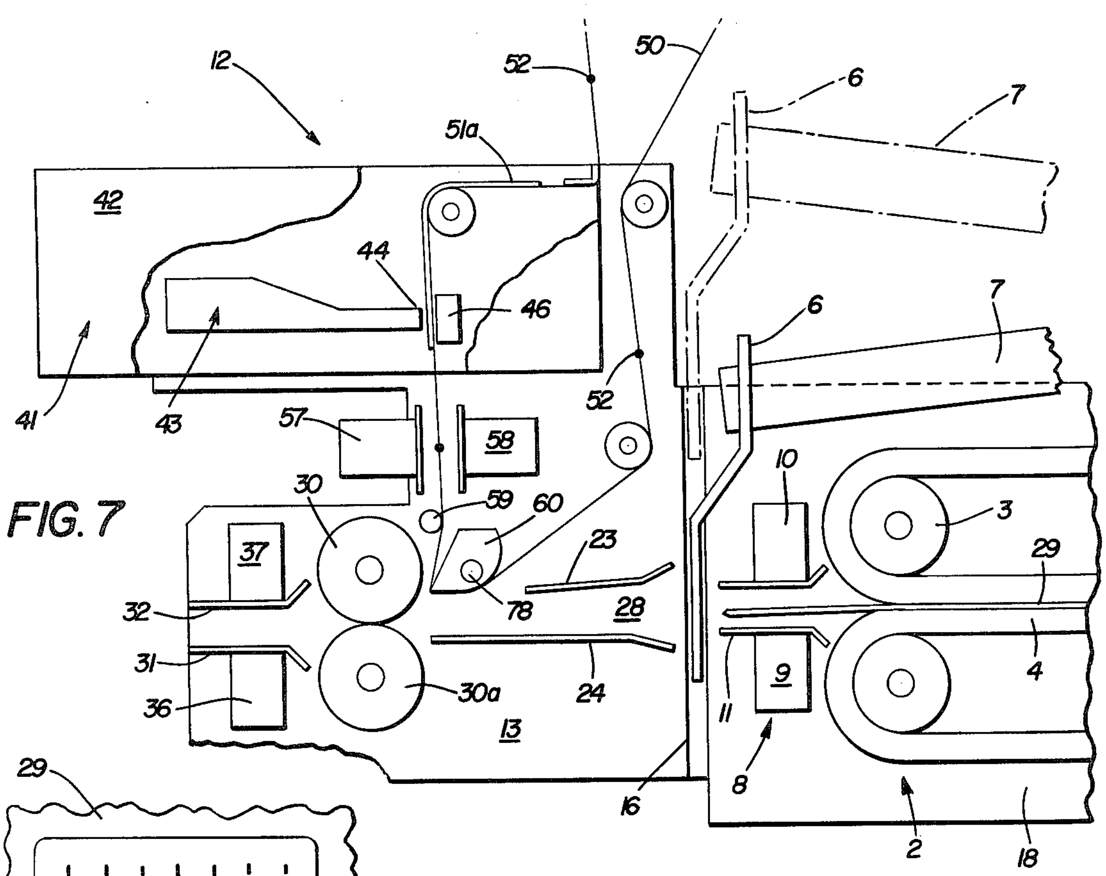
FIG. 7 is a diagrammatic view of certain of the parts of the mechanism at an initial stage of the operation of processing a label to be applied to a deposit containing envelope to be deposited.

The depository 1 and depositor accessory 12 in normal status ready to receive a deposit envelope 29 are illustrated in full lines in FIGS. 4 and 7. FIG. 7 shows an envelope 29 being deposited and just arriving at the conveyor belt discharge end 2 with its leading end just entering the discharge channel 11 and being sensed by the first sensor 8. The main drive of depository 1 is stopped momentarily by signals activated by the sensor which also activates movement of the gate activator 7 to open the gate 6 from the full line to the dot-dash line position of FIG. 7. The main drive for the belt conveyor 2–4 and for the depositor pressure rolls **30–30*a* is then resumed. At this time a label 51 on the carrying strip 50 is located at the position shown in FIG. 7, the carrying strip 50 having been stopped by sensor 56** at the end of the previous labeling operation.

Figure 8:
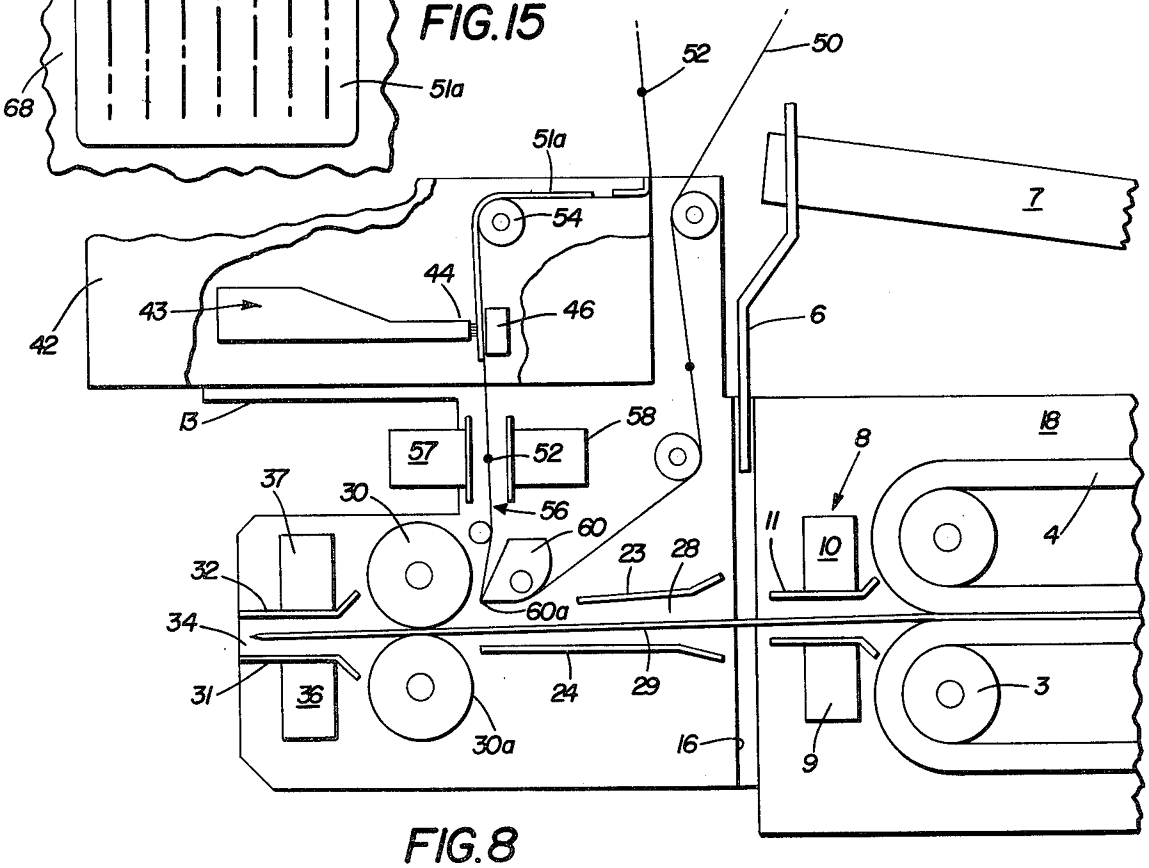
FIG. 8 is a diagrammatic view similar to FIG. 7 showing a further processing stage after the deposit containing envelope has been moved to and stopped at the labeling station, the blank label for the envelope being located at the printing station ready to be printed.

After the gate 6 has opened and the main conveyor drive started, the envelope 29 is conveyed into the receiving channel 28 of the depositor 12 and between the pressure rolls **30–30*a* as shown in FIG. 8 until its leading end is sensed by second sensor 35 which stops further conveyor movement with the envelope 29** movement stopped at the labeling station.

Figure 9:
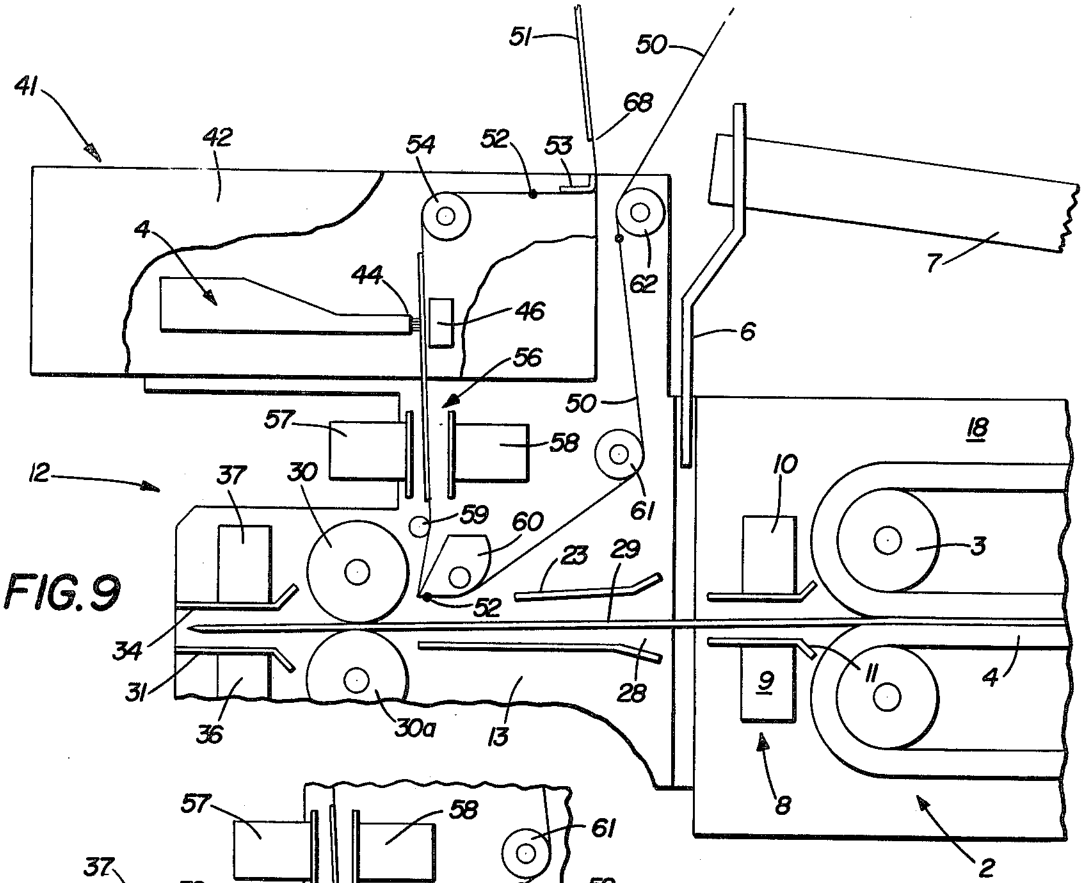
FIG. 9 is a view similar to FIG. 8 showing a further processing stage with the printing of the label to be applied nearly completed at the printing station.

At this time circuitry actuated by the sensor 35 energizes the printer 41 and it starts to print information transmitted to it from the system computer. The printer motor rotates the roll 54 to advance the carrying strip 50 in coordination with the printer's operation in printing line after line on the label 51 as illustrated in FIG. 9.

Printing continues until completed thereby producing a printed label on the carrying strip 50, such as indicated at **51*a* in FIG. 15. However, continued forward movement of the carrying strip 50 by printer motor through printer roll 54 moves the label 51 from the position shown in FIG. 9 to peel the label 51*a* from the strip 50, as illustrated in FIG. 10**.

At this time the label **51*a* during peeling, is stuck onto an envelope 29 for which the label 51*a* was prepared. Through the control circuitry, main conveyor movement is activated so that envelope 29 moves forward through the activated pinch rolls 30–30*a* (FIG. 10) as the label 51*a*** is being peeled and stuck to and pressed onto the envelope.

As the trailing end of the envelope 29 moves away from sensor 8, the gate 6 is closed. The labeled envelope 29 is discharged from the depositor to drop into the security compartment 20 (FIG. 2) and the main conveyor drive is stopped.

Meanwhile, when the sensor actuating opening 52, upstream on the carrying strip 50 from the label which has just been peeled, reaches the third sensor 56 (FIG. 11) the printer 41 is de-energized, and movement of the carrying strip 50 is stopped with the next label 51 upstream of the stopped sensor hole 52 in position ready to be printed in accordance with the requirements of the next deposit envelope 29 entered into the depository 1.

Accordingly, the foregoing new features of the present invention provide a new depositor accessory for envelope depository structures that enables information to be located on a deposit envelope which will facilitate processing of the deposit, even though the contents of the deposit envelope such as coin, etc. prevent printing such information on the deposit envelope. Extended printing directly on a coin containing envelope cannot be carried out by known simple printing equipment, such as ordinarily is used in depositories of automatic banking equipment which normally print a four-digit number only at an available location on the deposit envelope, which number also is printed on a receipt issued to a customer making the deposit.

Thus, the new depositor construction of the invention provides a device and mode of operation which achieve the stated objectives, eliminate difficulties existing in the use of prior devices, and solve problems and obtain the described new results.

In the foregoing description, certain terms have been used for brevity, clearness and understanding, but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the equipment is constructed and operated, and the advantageous, new and useful results obtained; the new and useful structures, devices, elements, arrangements, parts, combinations, systems, equipment, operations and relationships are set forth in the appended claims.

We claim:

1. Mechanism for labeling on a deposit-containing envelope deposit information about a deposit in said envelope, in which said deposit information is derived in part from a customer credit card entered by said customer into and read by a card reader in a credit card activated ATM-type envelope depository which verifies said customer's identity, in which said deposit information also is derived in part from indicia including said customer's personal identification number and the amount of the deposit entered by said customer into the depository keyboard, in which the depository has a control system that translates said entered information and indicia into signals transmitted to and from system computer-based control circuitry, in which said depository has conveyor means having conveyor drive means within a safelike compartment having an exit gate movable between closed and open positions at the discharge end of said conveyor means, and in which first sensor means is located adjacent the conveyor discharge end which senses arrival of the leading end of a deposit envelope being deposited and enables opening of said exit gate and continued conveyor means movement; wherein the improvement comprises depositor mechanism mounted at the discharge end of said conveyor means adjacent said exit gate, including, (a) conveyor roll means having upper and lower pinch rolls driven by said conveyor drive means and located in said depositor mechanism at a labeling station communicating with said depository conveyor means when said exit gate is opened by said first sensor means upon sensing the arrival at said first sensor means of the leading end of a deposit-containing envelope to be labeled;

(b) delivering said deposit containing envelope by said continued conveyor means movement when said exit gate is open to said driven conveyor roll means at said labeling station to engage the leading end of said deposit-containing envelope with said conveyor roll means to continue envelope movement through said conveyor roll means to adjacent second sensor means;

(c) dot matrix impact printer mechanism mounted at a printing station location adjacent said labeling station;

(d) pressure-sensitive-label carrying strip means movable in a path of travel from a pay-out spool through said printing and labeling stations to a take-up spool;

(e) peeler means engaging said carrying strip at said labeling station;

(f) said carrying strip normally being at rest with a label thereon in printing receiving position at said printing station; and (g) means enabled when said second sensor means senses the arrival of the leading end of said deposit-containing envelope at said second sensor means to energize the printer mechanism to print deposit information entered into the depository and transmitted to the printer mechanism, onto said label located at said printing station, to move said carrying strip in its path of travel, and to peel the printed label from the carrying strip at the labeling station by said peeler means onto its related deposit envelope during continued movement of said carrying strip.

2. The construction defined in claim 1 in which the conveyor roll means includes a lower pinch roll and an upper pinch roll movably spring pressed against said lower roll.

3. The construction defined in claim 1 including walls forming a channel between said exit gate and said conveyor roll means forming the communication between said conveyor roll means and said depository conveyor means through which a deposit envelope passes when being delivered to said conveyor roll means, and including walls forming discharge channel means through which a deposit envelope passes as it moves from said conveyor roll means past said adjacent second sensor means.

4. The construction defined in claim 1 in which said printer mechanism includes a printer head tip and a platen spaced therefrom between which a label on said carrying strip is located when said strip is at rest, and between which said strip moves as such label is being printed.

5. The construction defined in claim 1 including third sensor means located between said printing and labeling stations.

6. The construction defined in claim 1 in which a series of labels are carried on said label carrying strip spaced a predetermined distance apart; and in which the strip is formed with a sensor actuating opening intermediate successive labels.

7. The construction defined in claim 6 in which the spacings of the labels and the sensor actuating openings on the strip are the same.

8. The construction defined in claim 7 in which the spacing between the leading end of one label to another in the series of labels is 5" where the labels are $2\frac{1}{2}$" long arranged lengthwise on the strip.

9. The construction defined in claim 6 which includes third sensor means located between said printing and labeling stations; and in which when a label on said carrying strip is located at the printing station, the sensor activating opening in said strip ahead of the leading end of such label is located in third sensor means activating position.

10. The construction defined in claim 9 in which when said carrying strip is moving in its path of travel during printing of a label at said printing station and during peeling of such printed label at said labeling station, the sensor activating opening in said strip next upstream of such printed label upon arrival at said third sensor means activates said third sensor means to de-energize said printing mechanism and stop further movement of said carrying strip, thereby locating the next label upstream of said sensor activating opening at the third sensor means in position to be printed for the next deposit envelope entered into the depository.

11. The construction defined in claim 1 in which the peeler means includes a rotatable peeler member having a pointed portion movable between peeling and nonpeeling positions; and in which there is means for rotating said peeler member for peeling to nonpeeling position.

12. The construction defined in claim 11 in which the means for rotating the peeler member from peeling to nonpeeling position comprises a rotary solenoid connected with a shaft on which said peeler member is mounted.

13. The construction defined in claim 1 wherein the path of travel of said pressure-sensitive-label carrying strip means from a pay-out spool to a take-up spool is defined by threading the strip from the pay-out spool through an opening formed in the printer mechanism around an angle guide, then around an intermittently driven printer roll and between a printer head tip and platen and then through a channel and past third sensor means and at one side of a peeler means rod and around a pointed edge portion of a peeler means peeler member and finally around guide rollers to said take-up spool.

14. The construction defined in claim 13 in which a take-up motor is connected with the take-up spool to maintain sufficient tension on the label carrying strip to maintain the strip taut, and in which the take-up motor is a constant torque motor.

15. The construction defined in claim 2 in which the conveyor roll means pinch rolls press the printed label peeled from the carrying strip tightly onto the deposit-containing envelope moving through the conveyor roll means.

16. Mechanism for labeling on a deposit-containing envelope deposit information about a deposit in said envelope, in which said deposit information is derived in part from a customer credit card entered by said customer into and read by a card reader in a credit card activated ATM-type envelope depository which verifies said customer's identity, in which said deposit information also is derived in part from indicia including said customer's personal identification number and the amount of the deposit entered by said customer into the depository keyboard, in which the depository has a control system that translates said entered information and indicia into signals transmitted to and from system computer-based control circuitry, in which said depository has conveyor means having conveyor drive means within a safelike compartment having an exit gate movable between closed and open positions at the discharge end of said conveyor means, and in which first sensor means is located adjacent the conveyor discharge end which senses arrival of the leading end of a deposit envelope being deposited and enables opening of said exit gate and continued conveyor means movement; wherein the improvement comprises depositor mechanism mounted at the discharge end of said conveyor means adjacent said exit gate, including, (a) a frame (b) conveyor rolls driven by said depository conveyor drive means journaled on said frame in alignment with said conveyor means;

(c) spaced walls mounted on said frame forming a depositor receiving-channel aligned with said conveyor means and extending between said first sensor means and said conveyor rolls providing a path of movement for a deposit envelope from said conveyor means to said conveyor rolls when said gate is open;

(d) spaced walls mounted on said frame forming a depositor discharge-channel aligned with said receiving-channel and extending from said conveyor rolls to said safelike compartment;

(e) second sensor means located at said discharge-channel;

(f) dot matrix impact printer mechanism having a printer housing mounted on said frame, movable printer head means having a tip adjacent a platen in said housing, and a printer mechanism driven rotatable conveyor roll in said printer housing adjacent said printer head;

(g) pressure-sensitive-label carrying strip means having a pay-out spool journaled on said frame on which said strip with labels mounted thereon at spaced intervals is wound;

(h) a strip take-up spool journaled on a bracket spaced from said pay-out spool;

(i) means defining a path of movement for said label carrying strip from the pay-out spool into the printer housing, around said printer conveyor roll, between said printer head tip and said platen, around a peeler member, and past guide rolls to said take-up spool;

(j) said peeler member being located in the path of label carrying strip travel adjacent said conveyor rolls and between said conveyor rolls and said depositor receiving-channel;

(k) third sensor means located between said printer head tip and said peeler member having walls forming a channel through which the label carrying strip passes; and (l) means enabled when said second sensor means senses the arrival of the leading end of said envelope at said second sensor means to energize the printer mechanism to print deposit information entered into the depository and transmitted to the printer head, onto a label on said carrying strip located within the printer housing, to move said carrying strip in its path of travel, to then peel the printed label from the moving strip onto its related deposit envelope, and to convey said envelope through said conveyor rolls.

17. The construction defined in claim 16 in which the conveyor rolls include a lower pinch roll and an upper pinch roll movably spring pressed against said lower roll.

18. The construction defined in claim 16 in which a series of labels are carried on said label carrying strip means spaced a predetermined distance apart; and in which said strip is formed with a sensor actuating opening intermediate successive labels.

19. The construction defined in claim 18 in which the spacings of the labels and the sensor actuating openings on said strip are the same.

20. The construction defined in claim 19 in which the spacing between the leading end of one label to another in the series of labels is 5" where the labels are $2\frac{1}{2}$" long arranged lengthwise on the strip.

21. The construction defined in claim 18 in which when a label on said carrying strip means is located at the printer mechanism, the sensor activating opening in said strip ahead of the leading end of such label is located in third sensor means activating position.

22. The construction defined in claim 21 in which when said carrying strip means is moving in its path of travel during printing of a label and during peeling of such printed label, the sensor activating opening in said strip means next upstream of such printed label upon arrival at said third sensor means activates said third sensor means to de-energize said printing mechanism and stop further movement of said carrying strip means, thereby locating the next label upstream of said sensor activating opening at the third sensor means is position to be printed for the next deposit envelope entered into the depository.

23. The construction defined in claim 16 in which said peeler member is rotatable and has a pointed portion and is movable between peeling and nonpeeling positions; and in which there is means for rotating said peeler member from peeling to nonpeeling position.

24. The construction defined in claim 23 in which the means for rotating the peeler member from peeling to nonpeeling position comprises a rotary solenoid connected with a shaft on which said peeler member is mounted.

25. The construction defined in claim 16 in which a take-up motor is connected with the take-up spool to maintain sufficient tension on the label carrying strip means to maintain the strip taut, and in which the take-up motor is a constant torque motor.

26. The construction defined in claim 17 in which said pinch rolls press the printed label peeled from the carrying strip means tightly onto the deposit-containing envelope moving through the conveyor roll means.

* * * * *

UNITED STATES PATENT AND TRADEMARK OFFICE
CERTIFICATE OF CORRECTION

PATENT NO. : 4,435,243

DATED : March 6, 1984

INVENTOR(S) : Syed A. Azeez et al.

It is certified that error appears in the above-identified patent and that said Letters Patent is hereby corrected as shown below:

Column 14, line 37, "is" should read -- in --.

Signed and Sealed this

*Fifth* Day of *June 1984*

[SEAL]

*Attest:*

GERALD J. MOSSINGHOFF

*Attesting Officer* *Commissioner of Patents and Trademarks*